US005850924A

United States Patent [19]

Borter

[11] Patent Number: 5,850,924

[45] Date of Patent: Dec. 22, 1998

[54] VERTICAL STORAGE RACK SYSTEM

[76] Inventor: Clifford Lee Borter, 4922 N. Melrose Ave., Tampa, Fla. 33629

[21] Appl. No.: 509,776

[22] Filed: Oct. 16, 1995

[51] Int. Cl.$^{6}$ .......... A47F 7/00

[52] U.S. Cl. .......... 211/41.14; 211/41.15

[58] Field of Search .......... 211/40, 41, 46, 211/28, 70.5, 162; 414/267, 272

[56] References Cited

U.S. PATENT DOCUMENTS

| | | | |
|---|---|---|---|
| 2,253,764 | 8/1941 | Condon | 211/28 |
| 3,412,867 | 11/1968 | Barkow | 211/41 |
| 3,719,284 | 3/1973 | Rasmusson et al. | 211/41 X |
| 3,737,047 | 6/1973 | Ruth . | |
| 3,878,942 | 4/1975 | Hansen et al. | 211/41 X |
| 3,912,086 | 10/1975 | de Bruyn | 211/162 |
| 3,913,965 | 10/1975 | Muller et al. | 211/41 X |
| 4,278,175 | 7/1981 | Jackson | 211/41 |
| 4,304,336 | 12/1981 | Mays | 211/41 |
| 4,368,822 | 1/1983 | Kramer et al. | 211/41 |
| 4,489,835 | 12/1984 | Tombal et al. | 211/41 |
| 4,531,644 | 7/1985 | Margulies | 211/70.5 |
| 4,626,017 | 12/1986 | Robertson | 211/41 X |
| 4,778,064 | 10/1988 | Gold | 211/41 |
| 4,871,075 | 10/1989 | Moulds | 211/41 X |
| 4,874,098 | 10/1989 | Moulds | 211/41 X |
| 4,899,891 | 2/1990 | Sipilä et al. | 211/41 |
| 4,909,396 | 3/1990 | Younger, Jr. | 211/41 |
| 4,927,032 | 5/1990 | Mercure | 211/41 |
| 4,930,640 | 6/1990 | Edwards | 211/41 |
| 5,379,904 | 1/1995 | Brown | 211/41 |
| 5,465,883 | 11/1995 | Woodward | 211/41 X |
| 5,505,574 | 4/1996 | Piazza | 211/41 X |
| 5,584,399 | 12/1996 | King | 211/41 |

*Primary Examiner*—Robert W. Gibson, Jr.

[57] ABSTRACT

The Vertical Storage Rack System was primarily designed to stock cases of glass without the use of wooden crates around the glass. The removable rack post units can be placed anywhere along the bottom rack rails. The removable rack post units are placed on the bottom rack rails and locked into place by a 90° rotation. Then, two locking pins are dropped into the rack post base so that the removable rack post cannot be rotated out of the bottom rail. As the stock sheets of glass are depleted, the adjustable arms pivot down to take up any void caused by the stock depletion. End racks are incorporated in the storage system to store cut-off pieces of material too small to put back in the main rack system in a safe and efficient manner. The end racks also serve as rack ends of the rails acting as a barrier. The end racks protect people and material from getting hurt or damaged. The use of Tival 1000 UHMW plastic on all contact surfaces of the new adjustable vertical rack system reduces the effort by the workers to remove glass sheets from the rack system, therefore, making glass sheet handling more controllable and safer to handle.

6 Claims, 6 Drawing Sheets

6
20
2
2
2
4
2
4
3
5
3

22
21
23
35
26
25

25
23
4
22

28
21
22
21
22
30
31
21
22
22
21
35
33
34

21
33
22
31
30
29
36
33

33
33
36

28
29
22
29
22
30
31
20
22
21
23
34
26
24
25
27
33
32

20
22
29
28
30
31
26
37
20
30
31
38
22
26
23
2

37
31
21
31
21
37
21
37
23
26
4
26

VERTICAL STORAGE RACK SYSTEM

BACKGROUND OF INVENTION

1. Field of the Invention

This invention relates generally to an apparatus for the storage of heavy sheet products. More particularly, it relates to a storage apparatus for holding fragile glass sheets in large quantities and separates sheets into like types and sizes to allow immediate access to all types and sizes without moving adjacent sheets.

This invention allows large groups of glass sheets to be stored in a vertical position, parallel to each other, permitting removal of individual glass sheets, within the large groups of glass sheets, safely without endangering the handlers of the glass sheets or the other glass sheets remaining in the storage rack system.

2. Description of the Prior Art

In the prior art , various types of storage systems have been utilized to store sheet products. In general, these systems have not efficiently utilized warehouse floor space. Moreover, the prior art systems have not considered the loss of space from access pathways in between their storage systems when their sheet products are separated from each other in their storage systems. For example, the Storage Frame System in U.S. Pat. No. 5,584,399 to King, 1996, Dec. 17.

Many prior art storage systems have angled supports to store the sheet products in their storage systems. These angle supports allow the sheet products to safely lean to one side. However, removal of an interior sheet within the stack becomes time consuming and often dangerous. Many systems require all sheets in front of an interior sheet to be removed before an interior sheet can be removed. Other systems allow the outer sheets to be leaned out to allow for access. For example, Sheet Glass Supporting Rack U.S. Pat. No. 3,937,329 to Hammerel, 1976, Feb. 10. Due to the weight and the fragile nature of Sheet Glass, the leaning of glass sheets is very dangerous, sometimes overcoming and crushing a glass handler or tipping over a storage system.

As such, it would be desirable to provide a safer way to access interior stored sheets and space saving storage to provide a variety of sheets in a given area.

SUMMARY

In a disclosed embodiment of this invention, a storage system includes three bottom rails per unit section anchored to a substantial floor parallel to each other where a multiple of vertical post units opposed from each other in pairs which are rotated into the two outer rails creating sections perpendicular to the bottom rails for storage along the bottom rails. A middle rail is centered between the outer rails to maintain the horizontal height of a stock sheet as said sheet is being removed from a storage system. Moreover, the vertical posts can be positioned along the outer rails, so that, there is no unoccupied or lost space in-between stored sheet products along the bottom rails.

All contact between the storage system surfaces and the storage sheet products are separated by Tivar 1000 UHMW Plastic strips to provide a padding and a low co-efficient of drag to aid in the removal of individual glass sheets.

In other features of this invention, the pivoting angle arms pivot downward as the stored sheets are removed from the storage system keeping the remaining storage sheets in a vertical and perpendicular to the bottom rail position. This is very important for safety when glass sheets are used in the storage system.

In other features of this invention, the storage systems vertical post units are designed with a "cam" shape base. This base is designed to be rotated 90 degrees into the outer rails of the storage system, anywhere along the outer rails to set the post units in place to form divided sections for storage of sheet materials. When the post units are in place, pins are placed in the post units base, so that, post unit cannot be rotated out of the outer rail until the pins are removed.

In other features of this invention, the storage system can be lengthened by butting the bottom rails end to end to whatever length a user may need. Much like a railroad track. At the beginning and at the end of the bottom rails, end racks are placed to store leftover stored sheets and to prevent a passerby from walking into the ends of the stored sheets of materials.

These and other features of the present invention may be more clearly understood from the following specification and drawings, which of the following is a brief description.

DESCRIPTION OF THE PREFERRED EMBODIMENTS

Figure 1:
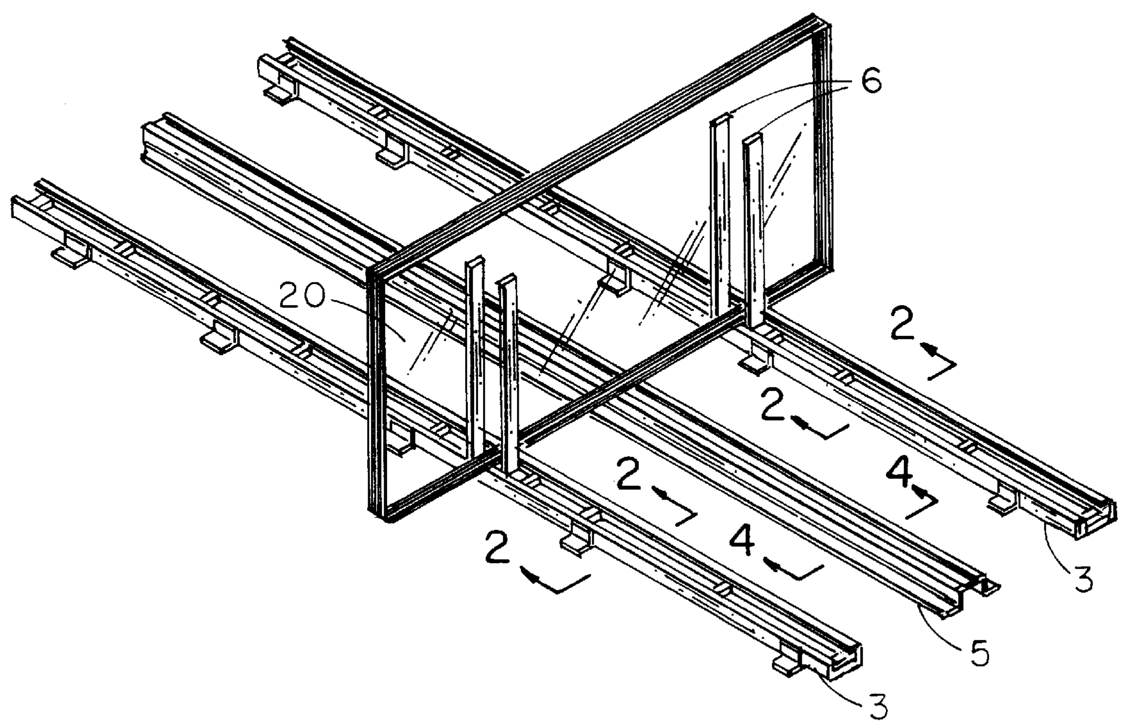
FIG. 1 Is a perspective view of the present Invention showing an adjustable glass case rack system holding a single case of glass along its rails.
Figure 2:
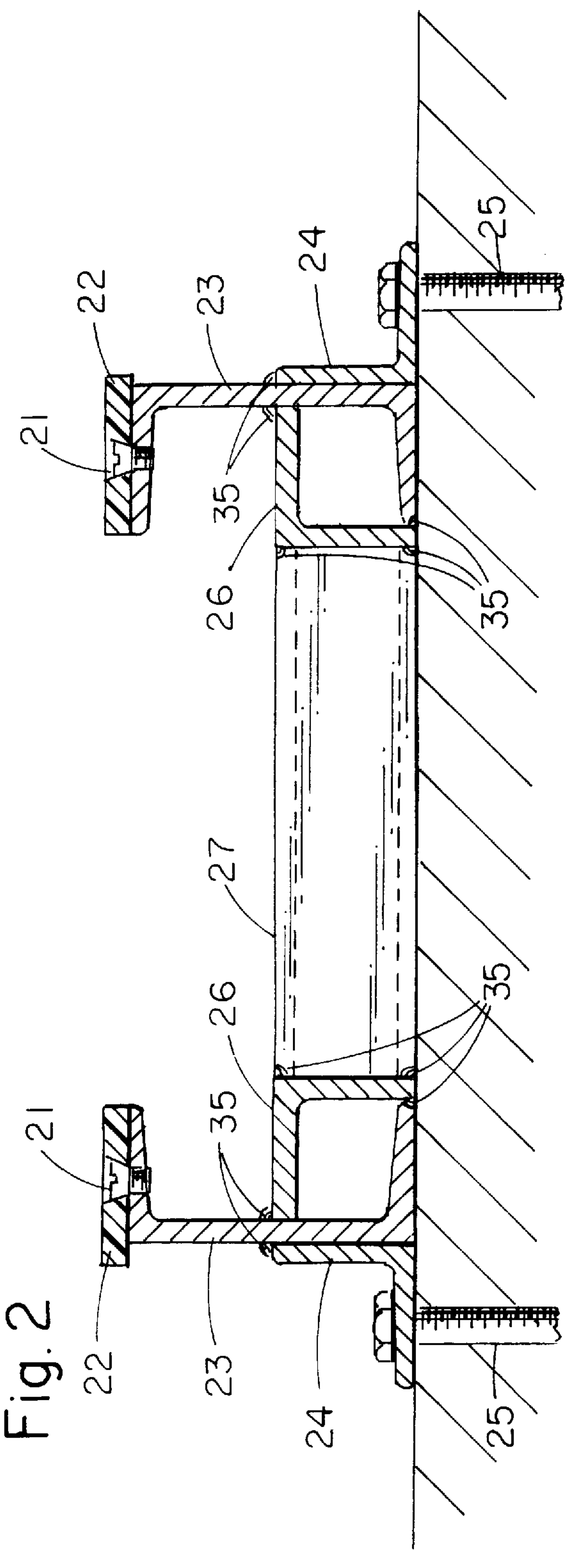
FIG. 2 Is a cross sectional view of one of the outer rails taken along line 2—2 of the glass rack system illustrated in FIG. 1.

Referring to the drawings the Vertical Storage Rack System as shown in FIG. 1, has one horizontal center rail (5) and two horizontal outer rails (3) preferably of rectangular outline shape and a plurality of vertical post units (6) extending upward from their base plate that are held along the outer horizontal rails (3) in an unlimited plurality of positions along the outer rails. The case(s) of flat glass sheets (20) are held vertically in place between the post units (6) and at the bottom by the two outer rails (3). Additional flat glass cases (20) can be stored on the outer rails (3) by adding vertical post units (6). Thus, leaving no unused outer rail surface in between flat glass cases (20) (due to the varying widths of glass cases) as seen in prior art with fixed pole systems. The outer rails as best shown in a cross-sectional view as shown in FIG. 2 shows the Tivar 1000 VHMW plastic strip (22) that is in direct contact with the glass cases (20) bottom surfaces. The Tivar 1000 VHMW plastic strips

Figure 3:
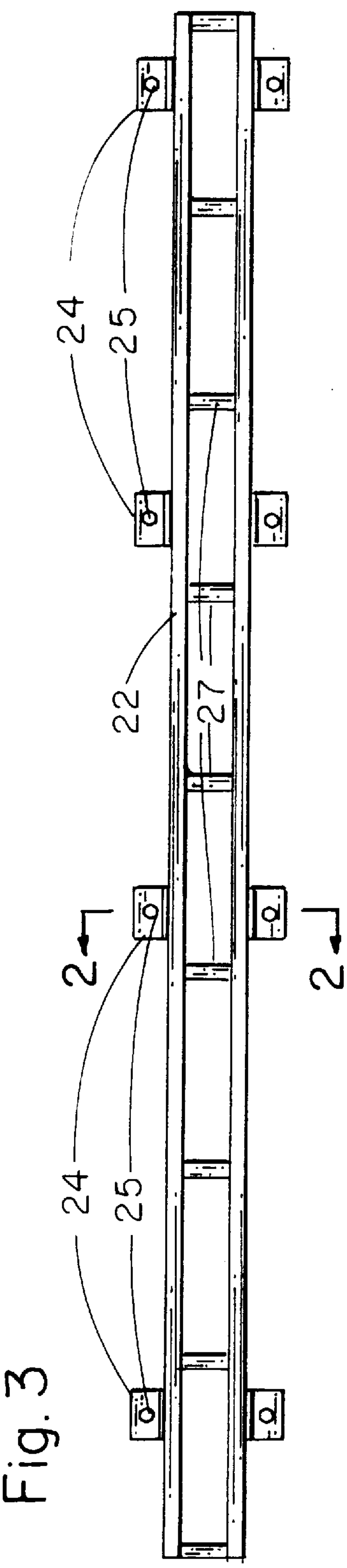
FIG. 3 Is a top plan view of the outer rail structure illustrated in FIGS. 1 and 2.

(22) are anchored down by an undercut threaded screw (21) into the continuous structural "C" channel (23) on both outer sides of the outer rail. Continuous structural angles (26) are continuously welded substantially along the entire length of the "C" channel (23) at the inside leg of the channel (23) and at the center rib section of the "C" channel (23) to form a square at the bottom of the "C" channel (23). The top surface of the continuous structural angle (26) serves as the contact surface of the vertical post unit's (6) base plate (32). On the other sides of the continuous structural "C" channel are the floor mounting clip angles (24) which are welded on the "C" channel intermediately along both outer sides of the outer rails (FIG. 3). The mounting clips angles (24) are anchored to the floor by the floor anchoring bolts (25) which go through a hole on the bottom side of the mounting clip angle (24). The two "C" channel assemblies which make up the two outer sides of the outer rails are held at the exact distance apart by the structural square tubing (27).

The structural square tubes are substantially welded along the perimeter of both ends of the structural square tubing (27) at equidistant intervals. The structural square tubing (27) stops the safety pins (34), the vertical pole units (FIG. 6) when the safety pins (34) are inserted into the base plate of the pole units, from sliding. Once the safety pins (34) are in place, the pole units cannot slide past structural square tubing (27) sections in the outer rails, thus, preventing the pole units from sliding off the ends of the rail (3) or from sliding more than a safe distance along the inside section of the outer rail (3). An overhead view of an outer rail is shown in (3). Mounting clip angles (24) are shown along the outer rail (3) and each one is anchored to the floor by a floor anchoring bolt (25). The Tivar 1000 WHMW plastic strips (22) are shown on the top surfaces of the outer rails (FIG. 3). The placements of the structural square tubing (27) are shown equally spaced along the outer rails (FIG. 3).

Figure 4:
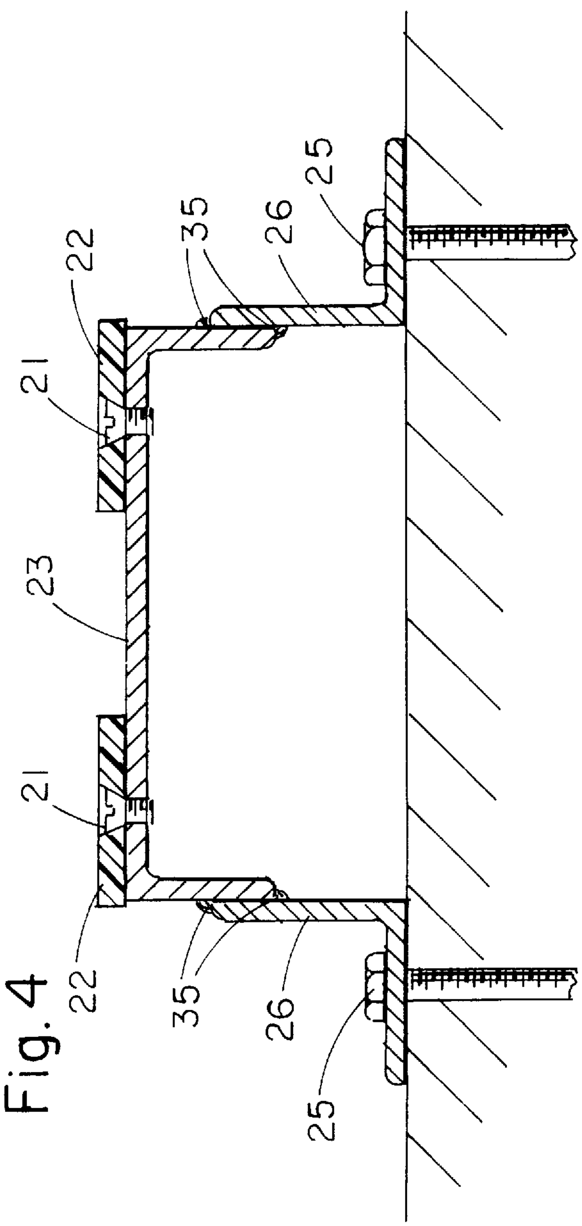
FIG. 4 Is a sectional view of the center rail, taken along line 4—4 of the glass rack system illustrated in FIG. 1.
Figure 5:
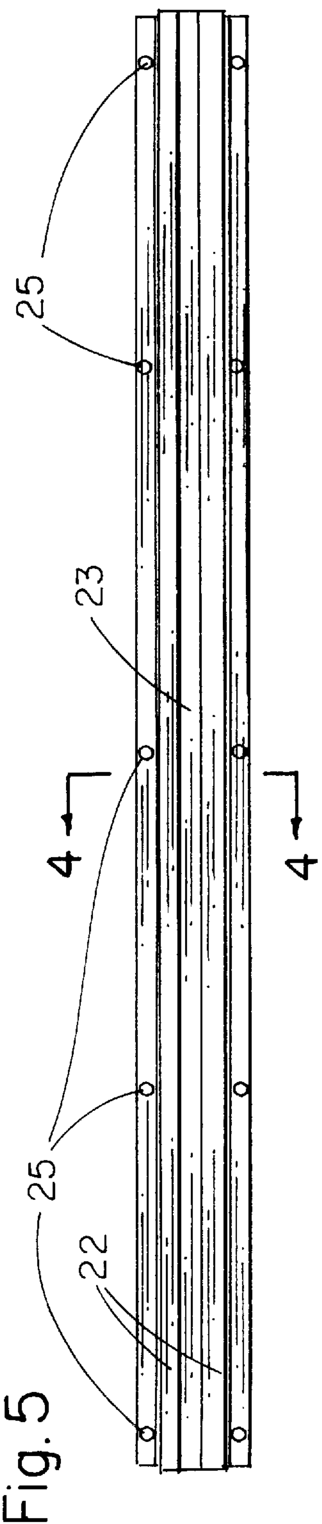
FIG. 5 Is a top plan view of the center rail illustrated in FIGS. 1 and 4.

FIG. 4 is a cross-sectional view of the center rail (5) of the Vertical Storage Rack System. All of the glass contact surfaces on the center rail, and all other glass contact surfaces, are the Tivar 1000 WHMW plastic strips (22) that are anchored down by undercut threaded screws (21) into the horizontal continuous "C" channel (23) which is welded to structural angles (26) at a height just below the outer rails (3) by continuous welding that is substantially along the entire length of the "C" channel (23) and the continuous structural angles (26); where anchoring bolts (25) anchor the center rail (5) to the floor. FIG. 5 is an overhead view of the center rail unit, its placement can be seen in the Vertical Rack Storage System centered in-between the two outer rails (3) in FIG. 1.

Figure 6:
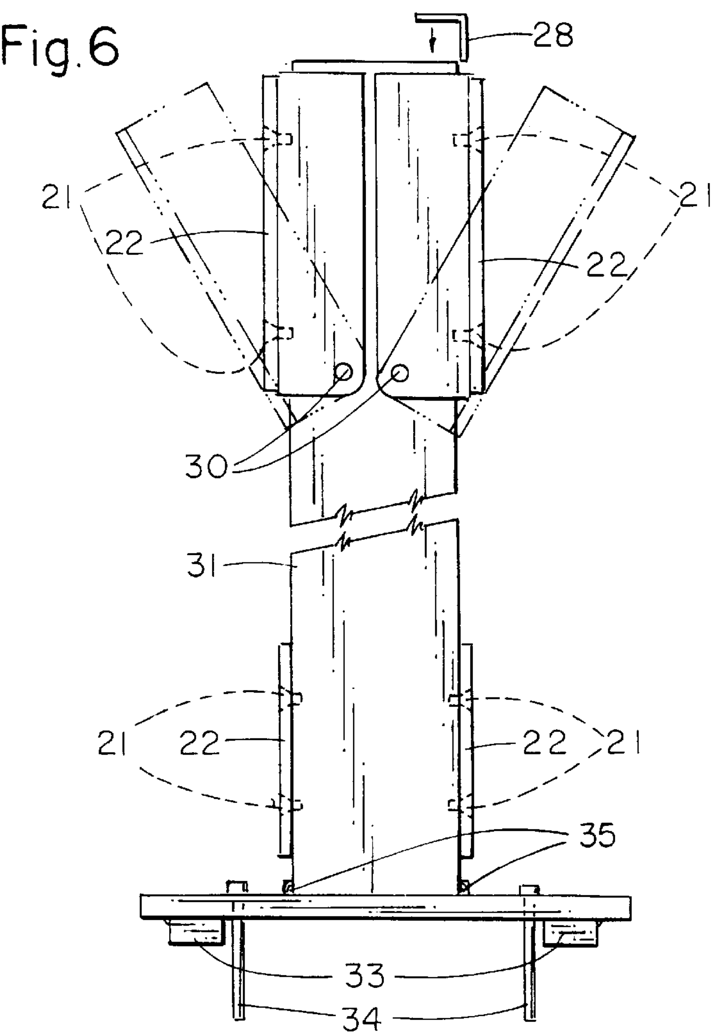
FIG. 6 Is a front elevational view of a post unit illustrated in FIG. 1.

FIG. 6 is a perspective side view of a vertical post unit. The vertical post unit is constructed of a structural square tubing (31) which is welded in three welding layers substantially and continuously along the entire perimeter of the structural square tubing (31) to the base plate (32). At the top end of the structural square tubing (31) there are pivoting angle arms (29). These pivoting angle arms (29) pivot on the structural square tubing (31) on the shoulder bolts (30) to take out any vacant space left by the depletion of the glass sheets from the glass cases (20) to eliminate any swaying motion that could occur possibly causing a domino effect with the heavy sheets of glass. The pivoting angle arms (29) have a strip of Tivar 1000 UHMW plastic (22) anchored by undercut threaded screws (21) to the glass contact side of the pivoting angle arms (29). The pivoting angle arms (29) lowered by gravitational pull (falling) and remain wedged against the glass sheets (20) by an angle wedge (28). The angle wedge (28) slides down the post units (6) as pivoting angle arms (29) pivot downward as glass sheets (20) are pulled out of the Vertical Storage Rack System creating a solid wedge against the remaining case of flat glass (20). The angle wedge (28) is continuous between the pairs of vertical post units (6) and is trapped between the pivoting angle arms (29) of each post between each case of flat glass (20). After the case of flat glass (20) is totally depleted, the angle wedge (28) can be placed on the top of the vertical post unit (6) until a new case of flat glass (20) is placed back into that section, starting the cycle again. At the bottom of the post unit (6) two strips of the Tivar 1000 VHMW plastic (22) are anchored to the structural square tubing (31) by undercut threaded screws (21). These Tivar 1000 VHMW plastic strips (22) provide a contact surface for the cases of flat glass in the Vertical Storage Rack System at the bottom of the vertical post unit (6).

The base plate (32) of the post unit (FIG. 6) has solid base plate stiffeners (33) that are welded substantially to the base plate (32), thus, adding greater strength and stiffness to the base plate unit. The safety pins (34) are placed in the base plate (32) after the post unit (6) has been rotated into place in the outer rail (3). Once the safety pins (34) are in place, the post units (6) cannot be removed from the outer rails (3) preventing the post units (6) from falling out from surrounding vibrations or from glass sheet removal actions.

The Vertical Rack Storage System can be made with post units (6) varying heights or one common height that have holes tapped at various heights to accommodate different sheet heights that may be required the pivoting angle arms (29) to be located at different levels on the post units (6), thus, accommodating the desired flat sheets and eliminating the need for varying post unit heights (FIG. 6). The tapped holes in the sides of the vertical post unit (6) make it possible to safely store cases of flat glass sheets (20) of different heights next to each other safely in the system.

Figure 7:
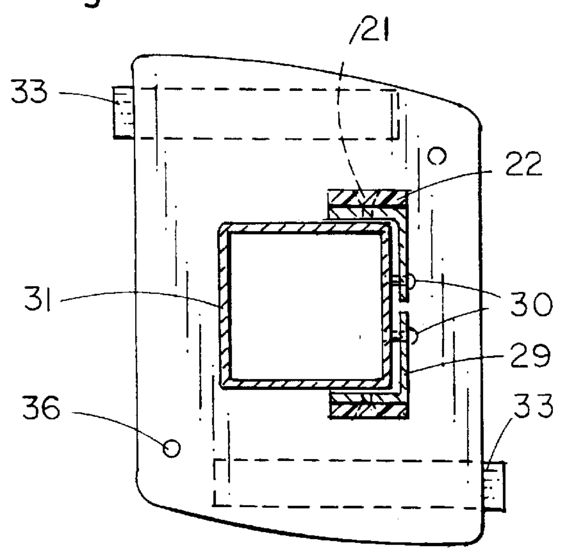
FIG. 7 Is the top plan view of a post unit illustrated in FIG. 6.

FIG. 7 shows the placement of the structural square tubing (31) of the post unit (6) on the rack post base place (32) and a top view of the placement of the pivoting angle arm units. The solid base plate stiffeners (33) extend slightly beyond the rack post base plate (32) for added stability.

Figure 8:
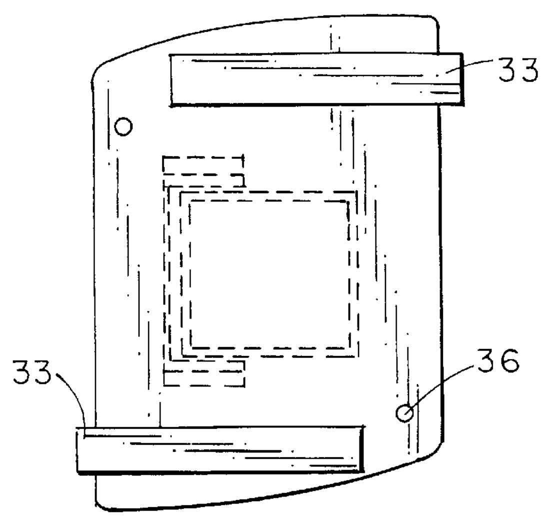
FIG. 8 Is a bottom elevation of a post unit illustrated in FIG. 6.

FIG. 8 is a bottom view of the post unit showing the placement of the base plate stiffeners (33) on the base plate (32) which rests on the top surface of the angle (of the outer rails) (26) when in place on the outer rails (3) and the placement of the safety pin guide holes (36) on the rack post base plate (32). The safety pin guide holes (36) guide the safety pin (34) along the vertical side of the angle (of the outer rails) (26) when the post unit (6) into the outer rail (3).

Figure 9:
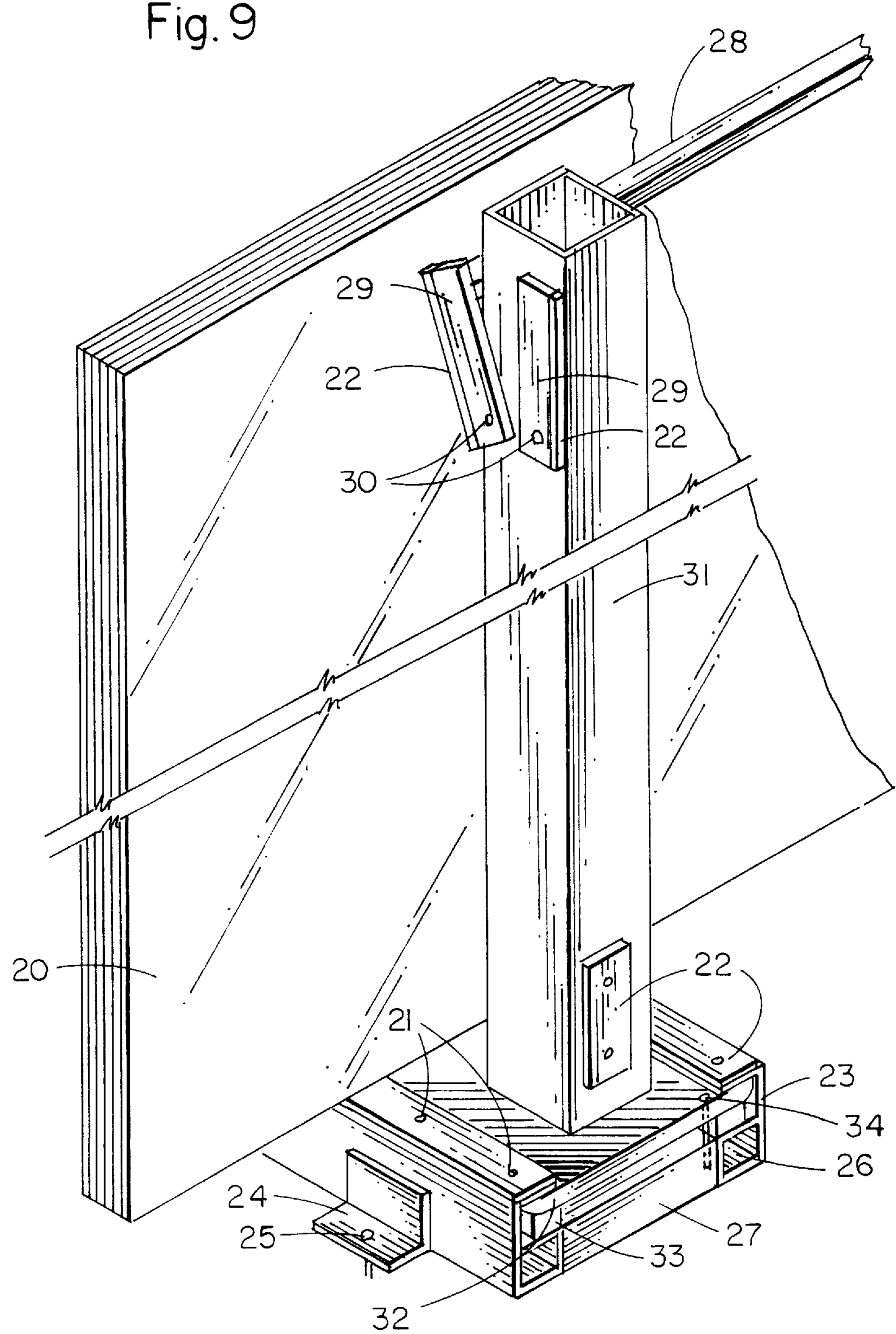
FIG. 9 Is a perspective view of a post unit (FIG. 6) in position on outer rail (FIG. 3) holding a case of glass vertically.

FIG. 9 is a cutaway view of an outer rail (3) and a post unit (6). The post unit (6) is rotated into the outer rail (3) with safety pin (34) engaged preventing post unit (6) from rotating out of outer rail (3). Also shown in FIG. 9 is the pivoting angle arm (29) keeping the case of flat glass (20) in a vertical position. The angle wedge (28) is seen lodging the pivoting angle arm (29) against the glass case (20). The angle wedge (28) is trapped in-between the two post units (6) on the outer rails by the pivoting angle arms (29) that are attached to the post units (6). The angle wedge (28) travels downward as the glass sheets are removed keeping the pivoting angle (29) against the remaining glass sheets (3) required to hold the cases of flat glass (20). The case of flat glass (20) can be seen resting on the Tivar 1000 VHMW plastic strip (22) which reduces the effort needed in the removal of the flat glass when needed. The Tivar VHMW plastic strips (22) can be seen wherever contact with the flat sheets of glass (20) come into contact with the Vertical Storage Rack System.

Figure 10:
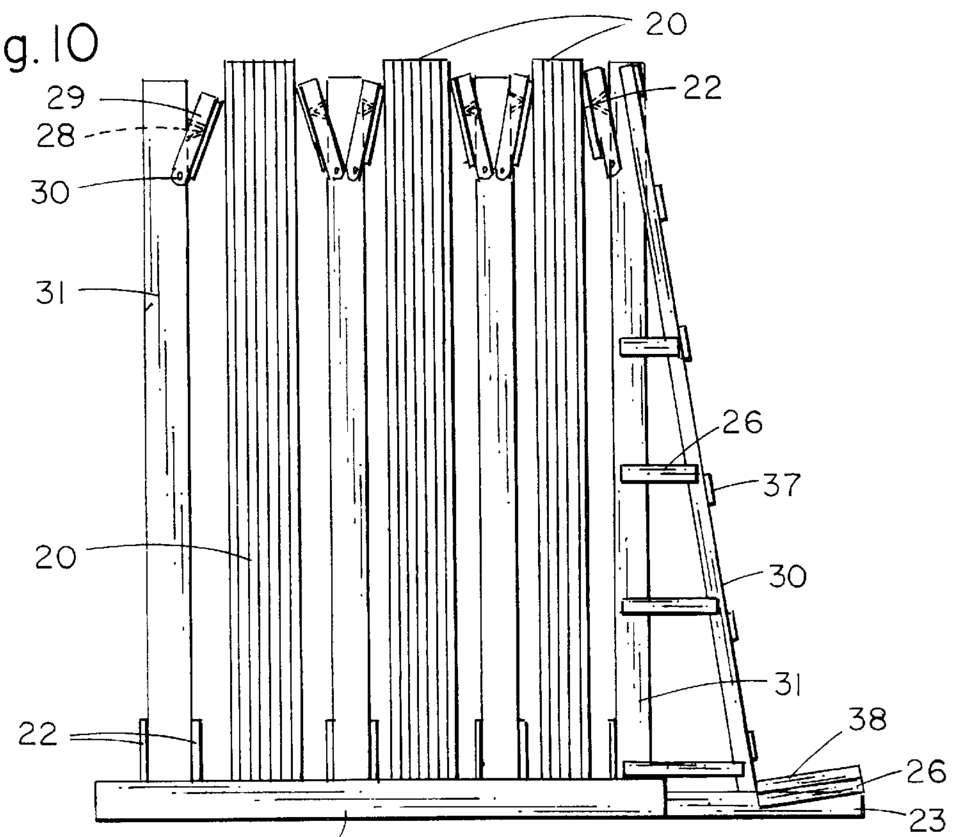
FIG. 10 Is a side elevational view of an end rack.

FIG. 10 shows a side view of an end rack designed to be placed at each end of the Vertical Storage Rack System to store cut-off flat sheets of glass too small to slide safely back into the Vertical Storage Rack System. The end rack is designed to be bolted directly to the post units (6). The base of the end rack is comprised of a "C" channel (23) with the sides of the channel facing up where angles (26) are welded to the "C" channels to form a right angle to the vertically angled "C" channel. A wooden plank (38) is bolted to the bottom angles (26) to form the base of the end rack. Angles of different lengths are bolted between the post units (6) and the vertically angled "C" channel (23) to give support to the vertically angled "C" channel (23).

Figure 11:
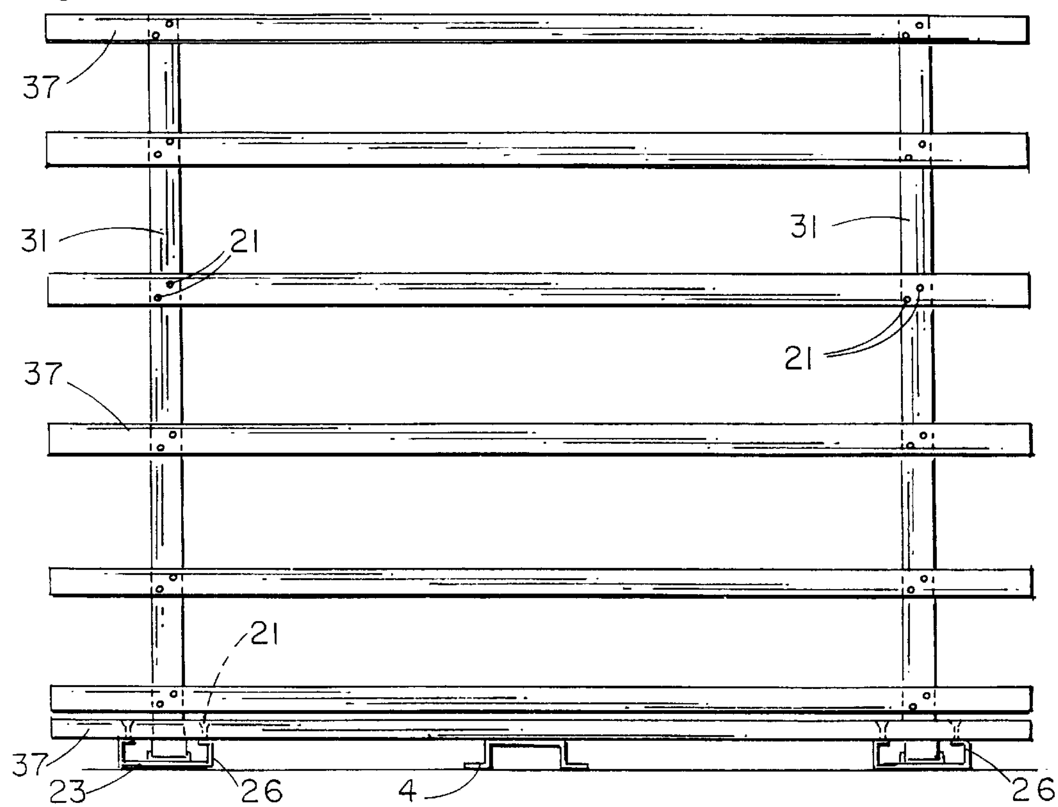
FIG. 11 Is a front elevational view of an end rack.

In FIG. 11 the end rack is shown where the horizontal rail (37) slats are used for the horizontal members to hold the cut-offs on the end rack. The plank (38) is shown bolted down to the angle (26) to form the base of the end racks. The end racks also acts as a barrier to the traffic around the Vertical storage rack system making the system safer.

I claim:

1. A vertical storage rack system for handling and storing glass sheets comprising: three horizontal rails secured to a supporting surface of which two rails are outer rails and one rail is a middle rail, a plurality of square vertical post units with cam-shaped bases which lock into the two outer rails with a 90° rotation, locking pins that drop into the cam-shaped bases and rest against the outer rails preventing any further rotation allowing the square vertical post units to be positioned anywhere along the outer rails leaving the tops of the square vertical post units open to allow handling higher sheets of glass and to allow glass loading from the top, where the square vertical post units secure glass sheets in a common plane to form a vertical support, where the outer rails hold the weight of the glass and the middle horizontal rail is utilized in the removal of individual glass sheets to prevent the glass sheets from hitting the support surface as they are removed from the storage system.

2. The vertical storage rack system according to claim 1 wherein the contact surfaces between the vertical storage rack system and the glass surfaces are covered with plastic strips which act as a flat bushing for the area between the storage rack and the glass and also aid in reducing friction in the removal of individual flat glass sheets.

3. The vertical storage rack system according to claim 1 wherein glass sheet removal allows pivoting arms at the top of the square vertical post units to hinge downward towards the remaining glass sheets to secure the glass sheets in a vertical plane by gravitational pull on the pivoting arms, the pivoting arms are positively secured by an angle wedge which lowers in between said pivoting arms and the square vertical post units, said angle wedge being continuous between the two outer rails and is contained in between the pivoting arms which are mounted on the outside side of the square vertical posts, thereby creating a condition of downward movement only for the angle wedge which secures the pivoting arms against the remaining glass sheets.

4. The vertical storage rack system according to claim 1 wherein said rails are butted with end racks perpendicular to the outer rails for storage of glass sheets, cut from larger glass sheets, that are too small to be placed into the vertical storage rack system's vertical post area, said end racks also serving as safety barriers to the exposed glass extending past the outer rails for personnel walking around the vertical storage rack system.

5. The vertical storage rack system according to claim 1 wherein the vertical post units are square posts to aid in the safety of the system once the glass sheets are loaded on the vertical storage rack system creating two flat surfaces parallel to one another, one flat surface being the flat glass surface while the other flat surface being the flat side of a square post, thereby keeping the vertical post unit from rotating out of the bottom outer rail, when the locking pins in the base of the vertical post units are not utilized.

6. The vertical storage rack system according to claim 1 wherein said bottom rails can be butted to each other in end-to-end relationship to form a desired length of the vertical storage rack system to suit storage needs.

* * * * *